(12) United States Patent
Rashingkar et al.

(10) Patent No.: US 10,372,860 B2
(45) Date of Patent: Aug. 6, 2019

(54) NETLIST ABSTRACTION FOR CIRCUIT DESIGN FLOORPLANNING

(71) Applicant: Synopsys, Inc., Mountain View, CA (US)

(72) Inventors: Balkrishna R. Rashingkar, San Jose, CA (US); Leonardus J. van Bokhoven, Waalre (NL); Peiqing Zou, San Jose, CA (US)

(73) Assignee: SYNOPSYS, INC., Mountain View, CA (US)

( * ) Notice: Subject to any disclaimer, the term of this patent is extended or adjusted under 35 U.S.C. 154(b) by 0 days.

(21) Appl. No.: 14/789,787

(22) Filed: Jul. 1, 2015

(65) Prior Publication Data

US 2017/0004240 A1    Jan. 5, 2017

(51) Int. Cl.
*G06F 17/50* (2006.01)

(52) U.S. Cl.
CPC ...... *G06F 17/5072* (2013.01); *G06F 17/5081* (2013.01); *G06F 2217/12* (2013.01); *Y02P 90/265* (2015.11)

(58) Field of Classification Search
CPC ............. G06F 17/5081; G06F 17/5045; G06F 17/505; G06F 17/5068; G06F 17/5022; G06F 17/504; G06F 17/5009; G06F 17/5072; G06F 2217/84; G06F 17/5031; G06F 17/5077; G06F 1/10; G06F 2217/12
USPC .................. 716/103–107, 118–119, 138–139
See application file for complete search history.

(56) References Cited

U.S. PATENT DOCUMENTS

| | | | | |
|---|---|---|---|---|
| 8,549,461 | B2* | 10/2013 | Huijbregts | G06F 17/505 703/16 |
| 2004/0111687 | A1* | 6/2004 | Dhanwada | G06F 17/5072 716/122 |
| 2005/0198605 | A1* | 9/2005 | Knol | G06F 17/5072 716/124 |
| 2013/0024828 | A1* | 1/2013 | Lu | G06F 17/5068 716/103 |
| 2014/0282338 | A1* | 9/2014 | Nayak | G06F 17/5081 716/120 |

\* cited by examiner

*Primary Examiner* — Nghia M Doan
(74) *Attorney, Agent, or Firm* — Park, Vaughan, Fleming & Dowler LLP; Laxman Sahasrabuddhe (57) ABSTRACT

Systems and methods are described for creating a netlist abstraction that provides full-chip context for performing circuit design floorplanning. The netlist abstraction can include a top-level netlist abstraction that corresponds to the top-level portion of the netlist, and a physical block netlist abstraction for each physical block in the circuit design. Each physical block netlist abstraction can retain macros that are in the physical block.

18 Claims, 7 Drawing Sheets

NETLIST ABSTRACTION FOR CIRCUIT DESIGN FLOORPLANNING

TECHNICAL FIELD

This disclosure relates to electronic design automation (EDA). More specifically, this disclosure relates to netlist abstraction for circuit design floorplanning.

BACKGROUND

Related Art

Advances in process technology and a practically unlimited appetite for consumer electronics have fueled a rapid increase in the size and complexity of integrated circuit (IC) designs. Floorplanning is an important stage in an EDA design flow that involves determining locations for various objects (blocks, modules, circuit elements, etc.) in the IC layout. The quality of the placement can significantly impact the overall quality of the final design.

Unfortunately, due to the rapid increase in the size and complexity of IC designs, conventional placement tools can require a very long time to perform placement on a circuit design, and the quality of the placed circuit design is often poor.

SUMMARY

Some embodiments described herein provide methods and systems for creating a netlist abstraction that provides full-chip context for performing floorplanning operations. The netlist for the circuit design may be divided into a top-level portion and a set of physical blocks. Some embodiments create the netlist abstraction based on a netlist of the circuit design as follow. A top-level netlist abstraction can be created based on the top-level portion of the netlist. Next, for each physical block in the set of physical blocks, the embodiments can create a physical block netlist abstraction based on a portion of the netlist that is in the physical block, wherein the physical block netlist abstraction retains macros that are in the physical block. The embodiments can then retain (1) connectivity information between objects in the netlist abstraction, (2) blockage information that identifies blockages for floorplanning operations, (3) move bound information which specifies spatial boundaries within which objects in the netlist abstraction must be placed, and (4) power domain information which specifies power domains associated with objects in the netlist abstraction. Next, the netlist abstraction can be loaded into a memory of a computing system, wherein the netlist abstraction provides full-chip context for floorplanning operations, and the computing system can be used to perform floorplanning operations on the netlist abstraction.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview of an EDA Flow

An EDA flow can be used to create a circuit design. Once the circuit design is finalized, it can undergo fabrication, packaging, and assembly to produce integrated circuit chips. An EDA flow can include multiple steps, and each step can involve using one or more EDA software tools. Some EDA steps and software tools are described below. These examples of EDA steps and software tools are for illustrative purposes only and are not intended to limit the embodiments to the forms disclosed.

Some EDA software tools enable circuit designers to describe the functionality that the circuit designers want to implement. These tools also enable circuit designers to perform what-if planning to refine functionality, check costs, etc. During logic design and functional verification, the HDL (hardware description language), e.g., SystemVerilog, code can be written and the design can be checked for functional accuracy, e.g., the design can be checked to ensure that it produces the correct outputs.

During synthesis and design for test, the HDL code can be translated to a netlist using one or more EDA software tools. Further, the netlist can be optimized for the target technology, and tests can be designed and implemented to check the finished chips. During netlist verification, the netlist can be checked for compliance with timing constraints and for correspondence with the HDL code.

During design planning, an overall floorplan for the chip can be constructed and analyzed for timing and top-level routing. During physical implementation, circuit elements can be positioned in the layout and can be electrically coupled.

During analysis and extraction, the circuit's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks, which are used during fabrication.

Netlist Abstraction for Circuit Design Floorplanning

For many large circuit designs the entire netlist does not fit in the memory (e.g., dynamic random access memory) that is available on the computer. Conventional placers typically use an iterative process to place the circuit design. The first step involves top-level placement of circuit blocks. In this step, the circuit blocks do not include details of the netlist within each block. Specifically, the pins of each block are assumed to be at the center of the block, and the blocks are placed based on user provided placement constraints (e.g., a circuit designer may provide placement constraints based on the circuit designer's knowledge of the data flow) and area constraints. In the second step, the pin locations of each block are determined based on the connections between the circuit blocks. The details of the netlist in each block are still not loaded in memory because of memory constraints. Finally, in the third step, the details of each block are loaded into memory and the netlist within each block is placed.

In conventional floorplanning tools, the third step cannot be performed for the entire circuit design at once due to memory constraints; therefore, the third step is often performed in a piecemeal fashion. For example, placement can be performed one circuit block at a time or a few circuit blocks at a time depending on the circuit block sizes and the available memory. However, if the quality of the final placement is poor (as is usually the case after the first iteration), then the circuit designer may need to go back to the first step and try to improve the top-level placement by providing additional placement constraints. This is one of the reasons why conventional approaches often require multiple iterations to place the circuit design, and the quality of the placed circuit design is often very poor.

In conventional floorplanning tools, the floorplanning operations that require a full-chip context to produce high quality designs are unable to produce high quality designs because they do not have access to the full-chip context. Floorplanning operations that require the full-chip context include, but are not limited to, block shaping and placement, macro placement, pin placement, and power network synthesis and analysis.

A netlist describes the connectivity between circuit elements in a circuit design. A circuit element can generally be any part or device in a circuit design. Each circuit element in a netlist has one or more ports or pins that can be electrically connected to other ports or pins. A netlist can be defined in a hierarchical fashion. For example, suppose the netlist defines a netlist object "M1" that corresponds to a primitive circuit element (i.e., a basic unit of the circuit design), e.g., a single logic gate, a single memory cell, etc. Next, suppose netlist object "M32" includes 32 instances of object "M1" and defines the interconnections between these 32 instances. Finally, let us assume that netlist object "M1024" includes 32 instances of object "M32" and defines the interconnections between these 32 instances. Note that netlist object "M1024" effectively defines the interconnections between 1024 primitive elements.

Defining netlists in a hierarchical fashion allows for a very compact representation. However, when circuit elements in a circuit design need to be placed, the hierarchical netlist may need to be "flattened," i.e., the netlist hierarchy may need to be unfolded so that the flattened netlist describes the circuit design using only a pre-defined set of primitive circuit elements. In the above example, when the netlist is "flattened," the netlist would include 1024 instances of the primitive circuit element and describe the interconnections between these 1024 instances. A flattened representation is much larger in size than the hierarchical representation. Floorplanning tools typically flatten a netlist before performing floorplanning operations, and because the large flattened netlist may not fit in the computer memory, the floorplanning tools may not have the full chip context for performing their operations.

A netlist abstraction is a representation of a circuit design that does not include all of the details of the full netlist of the circuit design. Some conventional approaches create netlist abstractions for checking top-level timing constraints. However, these netlist abstractions cannot be used for performing floorplanning because they do not have the information that floorplanning operations need to produce high quality results.

The logical hierarchy of a circuit design organizes circuit elements in the circuit design according to a given hierarchy (e.g., based on the hierarchy specified in the HDL description of the circuit design). The logical hierarchy can be based on the functions that different portions of the circuit design are supposed to perform. For example, if a particular high level function is implemented using four logically distinct sub-functions, then the logical hierarchy may divide the circuit design according to those four sub-functions. On the other hand, the physical hierarchy of a circuit design organizes circuit elements in the circuit design based on the physical location of circuit elements in the circuit design. A physical hierarchy divides the entire chip area (which corresponds to the top level in the physical hierarchy) into physically separate and non-overlapping circuit blocks, and each physically separate circuit block may be recursively divided into smaller circuit blocks, and so forth. In this manner, the physical hierarchy divides the circuit elements in a circuit design based on the location of the circuit elements in the chip area.

Although there is usually a loose correspondence between the logical hierarchy and the physical hierarchy, the correspondence is not exact. For example, a logical hierarchy block may be spread out over multiple physical hierarchy blocks. Conversely, a single physical hierarchy block may include multiple logical hierarchy blocks and/or portions of multiple logical hierarchy blocks.

In contrast to conventional approaches, some embodiments described herein create netlist abstractions to substantially improve the speed and the quality of results of floorplanning operations. Specifically, the netlist abstractions retain information that is required to provide full-chip context to floorplanning operations. Note that the netlist abstraction is substantially smaller in size (i.e., in terms of memory requirements) than the netlist itself.

A particularly challenging floorplanning operation involves placing macros. A macro can be a hard macro or a soft macro. A hard macro (also known as a hard macro cell) is a pre-defined circuit block that is significantly more complex than a standard cell. Common examples of hard macros include, but are not limited to, memory blocks, communication interfaces, processor cores, multimedia coders and decoders, etc. Hard macros have a fixed layout and are typically optimized for power, timing, and/or area. Hard macros are also usually designed for a particular semiconductor manufacturing technology. During floorplanning, the hard macro can be moved, flipped, rotated, etc., but the internals of the hard macro or the pin locations of the hard macro are fixed and cannot be modified. In contrast to hard macros, a soft macro is a pre-defined circuit block that is defined at a much higher circuit representation level (e.g., by using an HDL) than a hard macro, and therefore a soft macro can be manipulated by the EDA tool much more than a hard macro during floorplanning. Due to the inflexibility in handling macros during floorplanning, it is very difficult to perform macro placement (especially hard macro placement) with high quality when the full-chip context is not available.

Once the netlist abstraction has been created, the netlist abstraction for the entire circuit design can be loaded into the computer memory. Next, the embodiments can perform floorplanning operations on the netlist abstraction that provides full-chip context. Because the full-chip context is available to the floorplanning operations, the embodiments are able to generate high quality of results.

Figure 1:
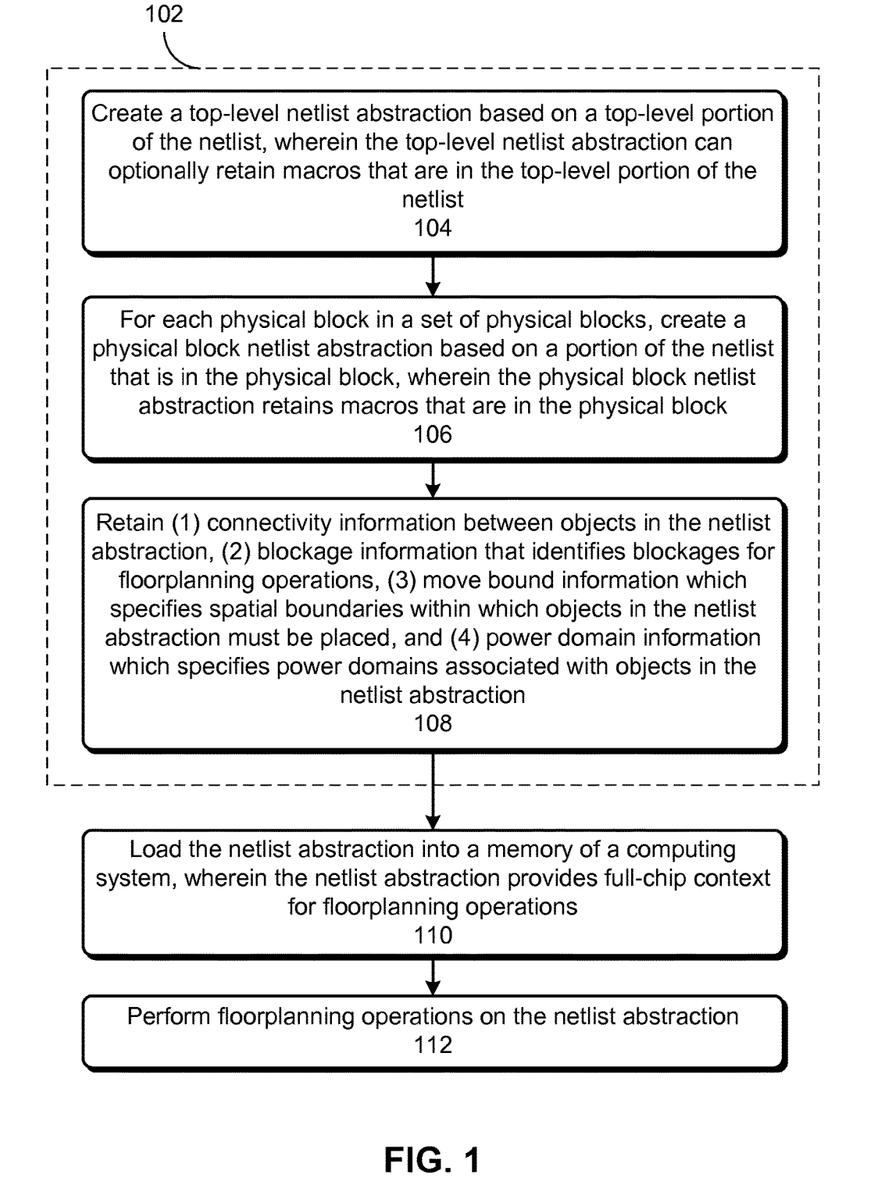
FIG. 1 illustrates a process for performing floorplanning operations on a circuit design by using a netlist abstraction that provides full-chip context in accordance with some embodiments described herein.

FIG. 1 illustrates a process for performing floorplanning operations on a circuit design by using a netlist abstraction that provides full-chip context in accordance with some embodiments described herein. The process can begin by creating a netlist abstraction based on a netlist of a circuit design, wherein the netlist abstraction provides full-chip context for floorplanning operations (operation 102). The netlist may be divided into a top-level portion and a set of physical blocks. The shape, size, and location of each physical block in the set of blocks can be determined during block shaping, and the determined shapes, sizes, and locations of the physical blocks can be used for other floorplanning operations such as macro placement and standard cell placement during which the macro locations and standard cell locations within each physical block can be determined.

In some embodiments, the process can create the netlist abstraction as follows. First, the process can create a top-level netlist abstraction based on the top-level portion of the netlist, wherein the top-level netlist abstraction can optionally retain macros that are in the top-level portion of the netlist (operation 104). Next, for each physical block in the set of physical blocks, the process can create a physical block netlist abstraction based on the portion of the netlist that is in the physical block, wherein the physical block netlist abstraction can retain macros that are in the physical block (operation 106). Additionally, the process can retain (1) connectivity information between objects in the netlist abstraction, (2) blockage information that identifies blockages for floorplanning operations, (3) move bound information which specifies spatial boundaries within which objects in the netlist abstraction must be placed, and (4) power domain information which specifies power domains associated with objects in the netlist abstraction (operation 108). In some embodiments, retaining connectivity information between objects in the netlist abstraction comprises: performing tracing on the netlist of the circuit design to identify electrical connections between macros and one or more logical netlist abstractions, and retaining the identified electrical connections.

In some embodiments, the top-level netlist abstraction and the physical block netlist abstraction for each physical block in the set of physical blocks can be created independently of each other. For example, the full top-level netlist can be loaded into memory and the netlist abstraction for the top-level netlist can be determined. Next, the full netlist for each physical block can be loaded into memory one at a time, and the netlist abstraction for each physical block can be determined independently. In some embodiments, the top-level netlist abstraction and the netlist abstractions for each physical block can be determined in parallel by using multiple processors. Once the netlist abstractions for the top-level netlist and the physical blocks have been determined, the process can "stitch" together the top-level netlist abstraction and the physical block abstractions by determining the connectivity information between ports of the top-level netlist abstraction and physical block netlist abstractions corresponding to the set of physical blocks. This connectivity information can be retained in the netlist abstraction for the circuit design.

In some embodiments, the top-level netlist abstraction can comprise one or more logical netlist abstractions, wherein each logical netlist abstraction corresponds to a portion of a logical hierarchy (LH). The logical hierarchy can be user specified or can be generated using techniques including, but not limited to, netlist partitioning, standard cell clustering, etc. In some embodiments, each logical netlist abstraction corresponds to a portion of the netlist that is below an LH node in an LH of the netlist of the circuit design, wherein each logical netlist abstraction comprises a center object that is electrically connected to a set of satellite objects, and wherein each satellite object corresponds to a port of the LH node. Likewise, each physical block netlist abstraction can comprise one or more logical netlist abstractions, wherein each logical netlist abstraction corresponds to a portion of the netlist that is below an LH node in an LH of the netlist of the circuit design, wherein each logical netlist abstraction comprises a center object that is electrically connected to a set of satellite objects, and wherein each satellite object corresponds to a port of the LH node. In some embodiments, at least one physical block netlist abstraction comprises a logical netlist abstraction corresponding to an LH node in an LH of the netlist of the circuit design, wherein the LH node encompasses a macro in the physical block. Further details of how a logical netlist abstraction can be created are described below.

Once the netlist abstraction has been created, the process can load the netlist abstraction into a memory of a computing system, wherein the netlist abstraction provides full-chip context for floorplanning operations (operation 110). The process can then perform floorplanning operations on the netlist abstraction (operation 112). The floorplanning operation can be block shaping and placement, macro placement (which determines physical locations for macros in the circuit design area), pin placement, and power network synthesis and analysis.

Figure 2A:
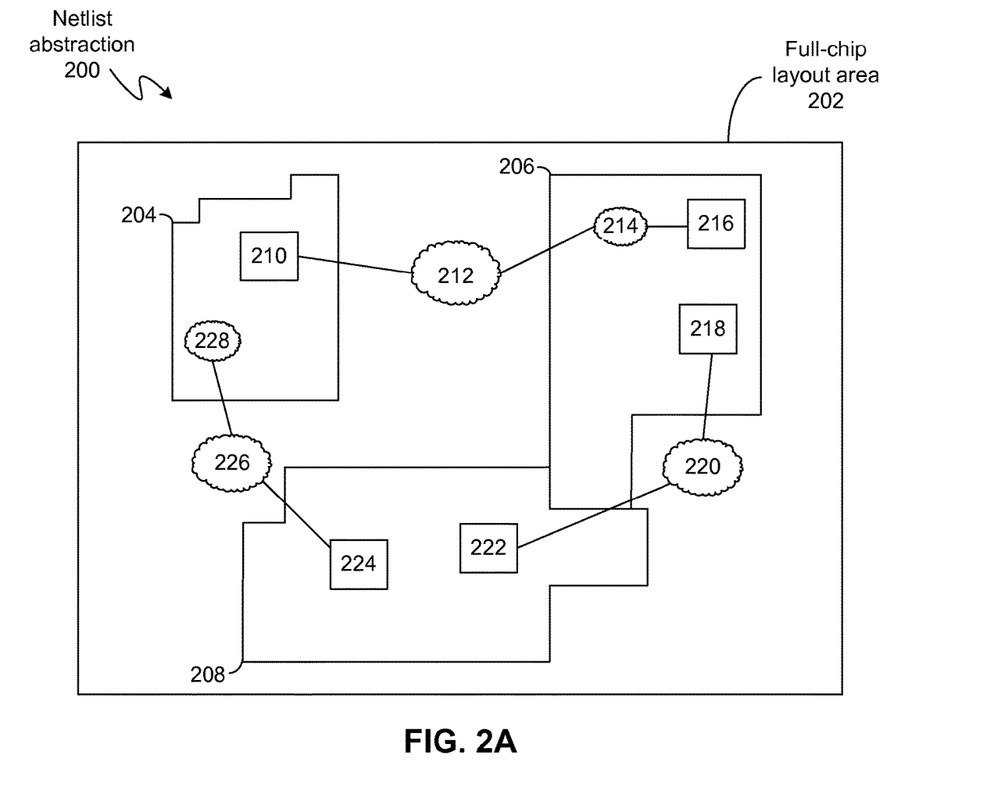
FIG. 2A illustrates a netlist abstraction for a circuit design in accordance with some embodiments described herein.

FIG. 2A illustrates a netlist abstraction for a circuit design in accordance with some embodiments described herein. The netlist for a circuit design can be divided into a top-level netlist and a set of physical blocks, e.g., blocks 204, 206, and 208. The top-level netlist includes circuitry that is outside blocks 204, 206, and 208. A top-level netlist abstraction can be created based on the top-level netlist. In FIG. 2A, each cloud represents a netlist abstraction of a portion of the netlist. For example, the top-level netlist abstraction can include clouds 212, 220, and 226 in FIG. 2A. A macro (soft or hard macro) can be present in the top-level netlist or in a physical block. For example, macro 210 is in block 204, macros 216 and 218 are in block 206, and macros 222 and 224 are in block 208. For each block, a block abstraction can be created. For example, cloud 228 and macro 210 together represent the block abstraction for block 204. Further details of how a netlist abstraction can be created for the top-level netlist and for the portion of the netlist in each physical block is explained below. The circuit design is to be placed in full chip layout area 202. Once netlist abstraction 200 has been created for the entire circuit design, the entire netlist abstraction 200 can be loaded into computer memory, and floorplanning operations that require the full-chip context can be performed using netlist abstraction 200. Some circuit designers may want to automatically reserve a portion of the physical block's boundary for accommodating block-to-block communication circuitry.

Figure 2B:
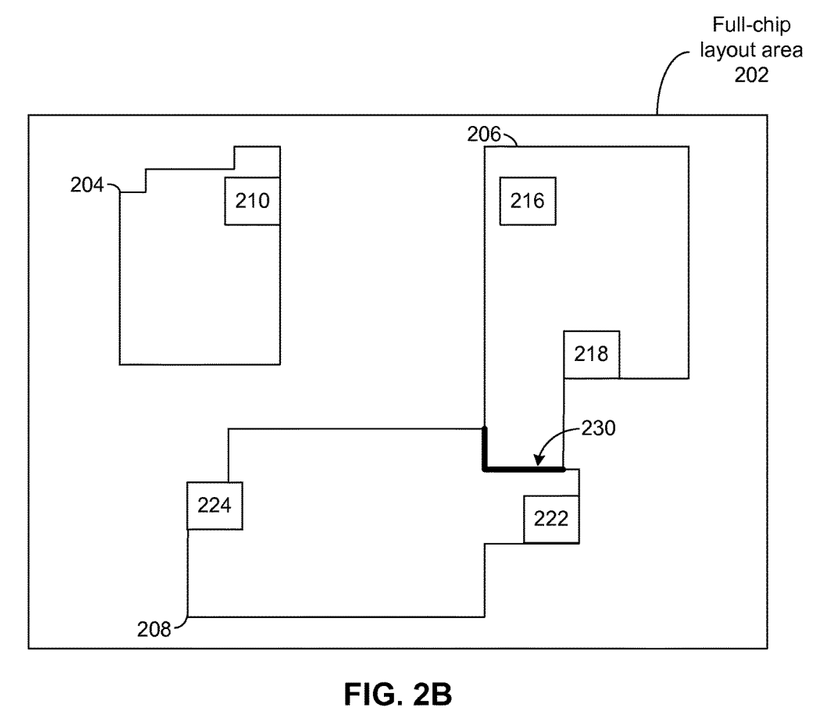
FIG. 2B illustrates how macro placement can be performed on a netlist abstraction that provides full-chip context in accordance with some embodiments described herein.

FIG. 2B illustrates how macro placement can be performed on a netlist abstraction that provides full-chip context in accordance with some embodiments described herein. Macros 210, 216, 218, 222, and 224 have been placed in full-chip layout area 202 based on netlist abstraction 200 shown in FIG. 2A. Macros 210, 218, 222, and 224 have been placed at the edges of blocks 204, 206, and 208 based on the connections that these macros have with circuit elements that are located outside their respective physical blocks. Macro 216 has not been located at the edge of block 206 because, as shown in FIG. 2A, there is additional circuitry in block 206 that lies between macro 216 and the edge of block 206. Moreover, note that edge portion 230 of physical block 206's boundary was automatically reserved by the floorplanning tool to be "macro free" so that block-to-block communication circuitry can be placed along edge portion 230 (this is why macro 222 may not have been placed by the floorplanning tool at the common boundary of physical blocks 206 and 208). Such "full-chip context aware" macro placement would not have been possible if the floorplanning operation did not have the full-chip context that was provided by netlist abstraction 200. In netlist abstraction 200, the area of a given logical netlist abstraction (e.g., logical netlist abstraction represented by cloud 214) can be substantially equal to the total area of the standard cells that are being abstracted by the given logical netlist abstraction.

Figure 3:
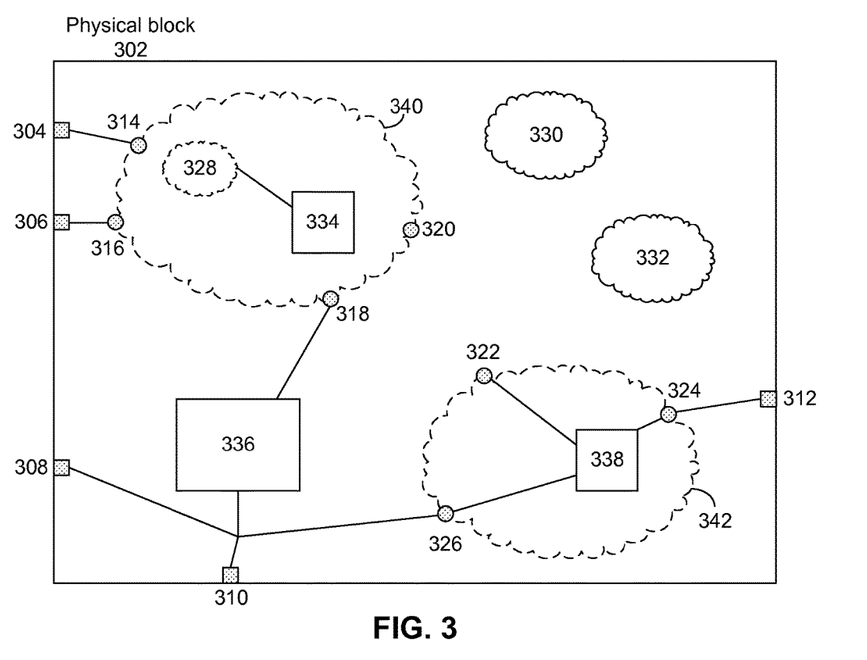
FIG. 3 illustrates a netlist abstraction for a physical block in accordance with some embodiments described herein.

FIG. 3 illustrates a netlist abstraction for a physical block in accordance with some embodiments described herein. Physical block 302 includes pins 304, 306, 308, 310, and 312 that are used for electrically connecting circuitry inside physical block 302 with circuitry outside physical block 302. Physical block 302 also includes hard or soft macros 334, 336, and 338. The portion of the netlist within physical block 302 can be abstracted as shown in FIG. 3. Clouds with a solid outline, e.g., 330 and 332, represent clusters of standard cells. Clouds with a dashed outline, e.g., 328, 340, and 342, represent logical netlist abstractions. Each logical netlist abstraction can include one or more ports. For example, logical netlist abstraction 340 includes ports 314, 316, 318, and 320; logical netlist abstraction 342 includes ports 322, 324, and 326.

Specifically, some embodiments can create the netlist abstraction shown in FIG. 3 as follows. Standard cell reduction can be performed by omitting content of cell clusters that match carefully selected logical hierarchies or are formed by cell clustering. For example, netlist abstractions represented by standard cell clusters 330 and 332 can be created in this manner. As mentioned earlier, macros can be retained including encompassing and sibling logical hierarchies. For example, macros 334, 336, and 338 have been retained in the physical block netlist abstraction shown in FIG. 3. Logical netlist abstraction 340 is an example of the encompassing logical netlist abstraction for macro 334, and logical netlist abstraction 328 is an example of a sibling logical netlist abstraction for macro 334. In addition, user-visible physical objects like edit groups/move bounds are also retained. For example, the boundary of physical block 302 represents a move bound for circuit elements within physical block 302, and that move bound is retained in the netlist abstraction.

Finally, the connectivity seen between macros and/or logical netlist abstractions are retained. Specifically, tracing can be performed on the full netlist to identify the electrical connections between the macros and the logical netlist abstractions. The identified electrical connections are illustrated in FIG. 3 by solid straight lines, e.g., the lines that connect physical block pins 308 and 310 with macro 336 and port 326 of logical netlist abstraction 342. Important characteristics of the traced electrical connections can be retained in the netlist abstraction. For example, suppose a traced electrical connection in the full netlist is as follows: C1-net1-C2-net2-C3-net3-(C4, C5, C6). In this representation, "C1," "C2," etc. are circuit elements, and "net1," "net2," etc. are nets that interconnect a set of pins. Specifically, "net1" electrically connects an output pin of circuit element "C1" with an input pin of circuit element "C2," and "net3" electrically connects an output pin of circuit element C2 with input pins of circuit elements C4, C5, and C6. Further, let us assume that circuit elements C1, C4, C5 are being retained in the netlist abstraction (e.g., circuit elements C1, C4, and C5 may be macros). Although the electrical connection in the full netlist between circuit elements C1, C4, and C5 includes net1, C2, net2, C3 and net3, these elements are not retained in the netlist abstraction. In some embodiments, the information that is retained and stored in the netlist abstraction are (1) the circuit elements C1, C4, C5, (2) the fact that a particular output pin of circuit element C1 is electrically connected with particular input pins of circuit elements C4 and C5, and (3) important characteristics of the electrical connection, e.g., the connectivity width. Note that the amount of information that is retained in the netlist abstraction is substantially less than the full netlist for the physical block. The above-described approaches for abstracting a netlist have been presented only for purposes of illustration and description. They are not intended to be exhaustive or to limit the present invention to the forms disclosed. The next section describes an embodiment for creating a logical netlist abstraction.

Logical Netlist Abstraction

Figure 4A:
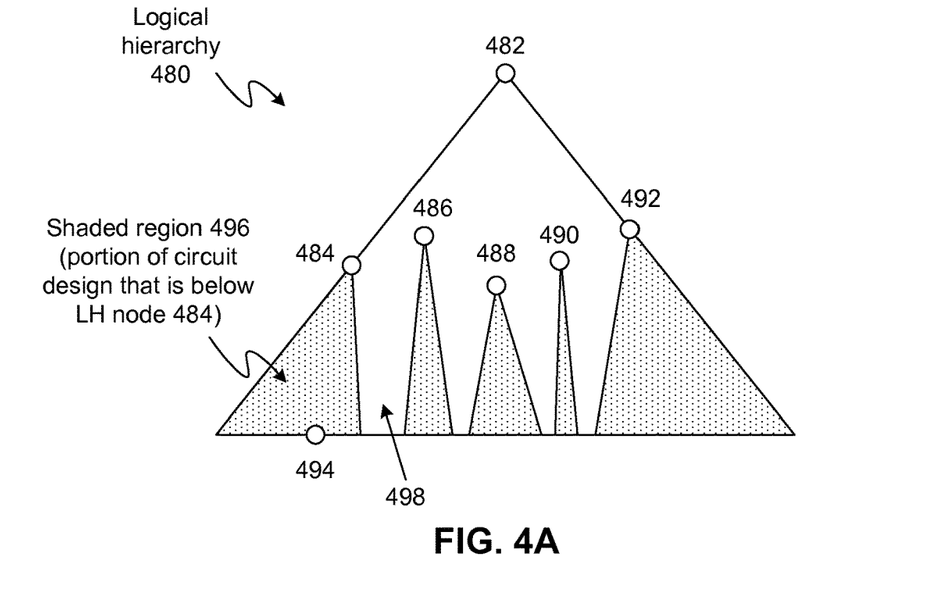
FIG. 4A illustrates a logical hierarchy of a circuit design in accordance with some embodiments described herein.

Embodiments described herein can generally use any circuit abstraction technique that retains the appropriate information for providing full-chip context to floorplanning operations. The following paragraphs describe a particular netlist abstraction technique that retains area and connection information. The following technique is being presented only for purposes of illustration and description, and is not intended to limit the present invention. Many modifications and variations of the netlist abstraction technique will be apparent to those skilled in the art. FIG. 4A illustrates a logical hierarchy of a circuit design in accordance with some embodiments described herein. Logical hierarchy 480 includes logical hierarchy nodes 482-494. Logical hierarchy node 482 can be the top-level node that can correspond to either the entire circuit design or to a physical block (e.g., a memory block, a processor block, etc.) in the circuit design. Logical hierarchy nodes 484-492 can correspond to intermediate nodes in logical hierarchy 480, and logical hierarchy node 494 can correspond to a leaf node in logical hierarchy 480. An intermediate-level node in logical hierarchy 480 can correspond to an intermediate-level entity (e.g., a multiplexer, an adder, a register bank, etc.) within the circuit design. Specifically, an intermediate-level node can correspond to a module in an HDL (e.g., SystemVerilog) file that describes the circuit design. A leaf node, e.g., logical hierarchy node 494, can correspond to a basic component of the circuit design, e.g., an inverter.

The shaded regions under logical hierarchy nodes 484, 486, 488, 490, and 492 correspond to portions of the circuit design netlist that are within each of those logical hierarchy nodes. For example, shaded region 496 corresponds to the portion of the circuit design netlist that is below logical hierarchy node 484. Nodes within shaded region 496 correspond to entities that are part of the circuitry for logical hierarchy node 484. For example, if logical hierarchy node 484 corresponds to an adder module, then shaded region 496 can correspond to the netlist for the adder module, and logical hierarchy node 494 that is within shaded region 496 can correspond to a circuit element (e.g., an inverter) that is in the adder module netlist. The non-shaded regions in logical hierarchy 480 correspond to portions of the netlist that are not within logical hierarchy nodes 484, 486, 488, 490, or 492. For example, non-shaded region 498 can include circuitry that electrically interconnects a first circuit element in hierarchy node 484 with a second circuit element in hierarchy node 486.

Figure 4B:
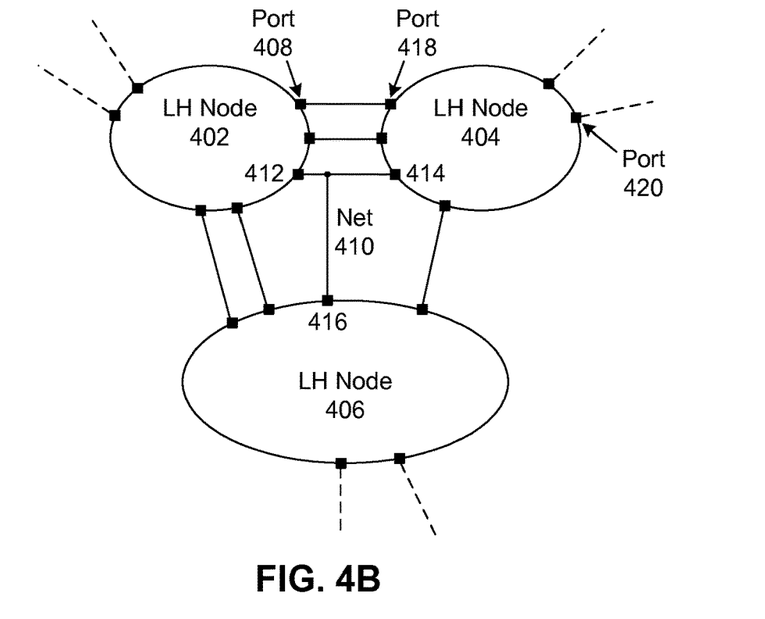
FIG. 4B illustrates a view of a netlist in accordance with some embodiments described herein.

FIG. 4B illustrates a view of a netlist in accordance with some embodiments described herein. The ovals shown in FIG. 4B represent portions of the netlist that correspond to logical hierarchy nodes 402-406. Each oval in FIG. 4B includes one or more dark squares on the oval's boundary. Each of these squares represents a port of the logical hierarchy node. A port can be used to receive a signal from a circuit element that is not within the logical hierarchy node or to provide a signal to a circuit element that is not within the logical hierarchy node. Examples of signals that can be received at a port or that can be provided by a port include, but are not limited to, clock, data, and address signals. Note that a port of a logical hierarchy node can correspond to an input pin or an output pin of a circuit element that is below the logical hierarchy node in the logical hierarchy.

A port of a logical hierarchy node can be electrically connected to ports of other logical hierarchy nodes and/or to other circuit elements in the circuit design. For example, port 408 in logical hierarchy node 402 can be electrically connected to port 418 in logical hierarchy node 404. Likewise, net 410 can be used to electrically connect ports 412, 414, and 416 in logical hierarchy nodes 402, 404, and 406, respectively. Port 420 may be electrically connected to one or more circuit elements that are not in the logical hierarchy nodes shown in FIG. 4B.

Some embodiments can create an abstraction for a portion of the netlist as follows. The embodiments can receive a netlist for a circuit design and receive a set of logical hierarchy nodes in the logical hierarchy. For example, a user may provide the set of logical hierarchy nodes to the netlist abstraction tool, e.g., by selecting circuit blocks using a graphical user interface, by providing a list of logical hierarchy node identifiers in a file, etc. Alternatively, the netlist abstraction tool may automatically (i.e., without user input) select the set of logical hierarchy nodes, e.g., based on an area threshold (e.g., the tool may automatically select the lowest logical hierarchy nodes whose areas are greater than the area threshold), a cell count threshold (e.g., the tool may automatically select the lowest logical hierarchy nodes whose cell counts are greater than the cell count threshold), a macro count threshold (e.g., the tool may automatically select the lowest logical hierarchy nodes whose macro counts are greater than the macro count threshold), etc. Next, the embodiments can create the netlist abstraction by, for each logical hierarchy node in the set of logical hierarchy nodes, replacing a portion of the netlist that is below the logical hierarchy node with a star netlist, wherein the star netlist includes a center object that is electrically connected to a set of satellite objects, wherein each satellite object corresponds to a port of the logical hierarchy node.

Figure 4C:
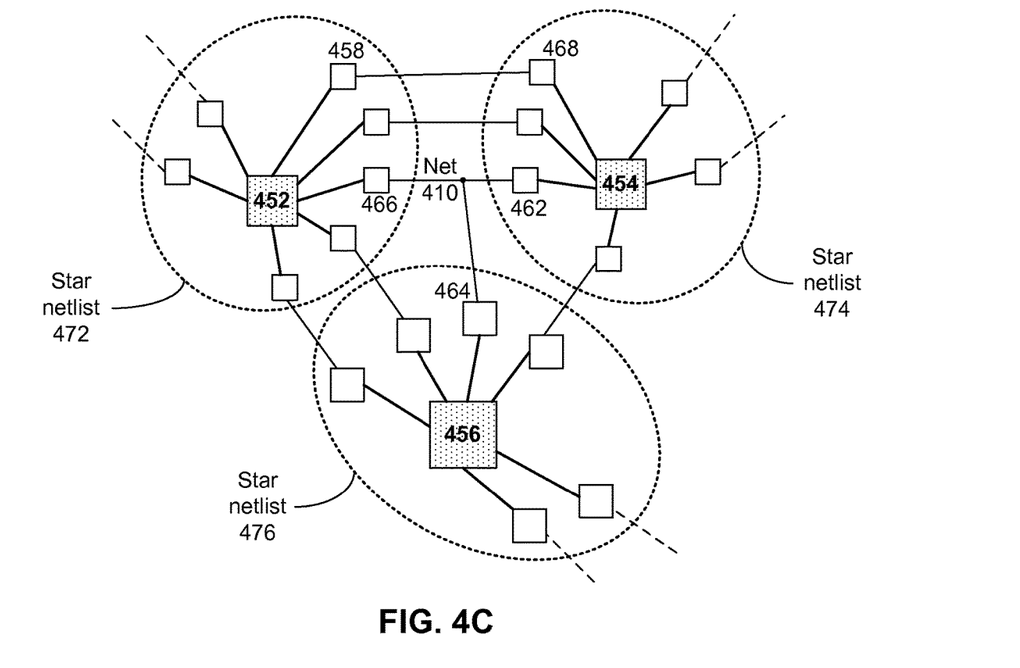
FIG. 4C illustrates how a logical netlist abstraction can be created from a netlist in accordance with some embodiments described herein.

FIG. 4C illustrates how a logical netlist abstraction can be created from a netlist in accordance with some embodiments described herein. Given a set of logical hierarchy nodes in a circuit design netlist, a netlist abstraction can be created by performing the following operations for each logical hierarchy node in the set of hierarchy nodes: (1) create a star netlist for the logical hierarchy node, wherein each star netlist includes a center object (e.g., center objects 452, 454, and 456) that is electrically connected to one or more satellite objects (e.g., satellite objects 458, 462, 464, 466, and 468), and wherein each satellite object corresponds to a port in the logical hierarchy node, and (2) replace the portion of the netlist below the logical hierarchy node with the star netlist. Note that the star netlist can be substantially smaller in size than the portion of the netlist that the star netlist replaces.

The netlist abstraction shown in FIG. 4C corresponds to the netlist shown in FIG. 4B. Star netlists 472, 474, and 476 correspond to logical hierarchy nodes 402, 404, and 406, respectively. Each star netlist includes a center object (shown as a shaded square in FIG. 4C) that is electrically connected to one or more satellite objects (shown as non-shaded squares in FIG. 4C). For example, center object 452 is electrically connected to satellite objects 458, 466, and five other satellite objects. In the original netlist, logical hierarchy node 402 may have included thousands or millions of circuit elements. Note that, in the netlist abstraction shown in FIG. 4C, the circuit elements (which can be in the thousands or millions) in logical hierarchy node 402 have been replaced by star netlist 472 (which includes only eight objects).

The electrical connections that existed in the original netlist between a port of a logical hierarchy node and other ports or circuit elements can be retained in the netlist abstraction. For example, in the original netlist shown in FIG. 4B, an electrical connection existed between port 408 and port 418. This electrical connection is retained in the netlist abstraction shown in FIG. 4C so that satellite object 458 (which corresponds to port 408) is electrically connected to satellite object 468 (which corresponds to port 418).

In some embodiments, the electrical connections between the center object and the satellite object can be assigned a sufficiently high weight so that the placement engine keeps the center object and the satellite objects in proximity to one another during placement. For example, the electrical connection between center object 452 and satellite object 458 can be assigned a weight that is greater than the weight of the electrical connection between satellite objects 458 and 468 (note that the weight of the electrical connection between satellite objects 458 and 468 can be the same as the weight that existed in the original netlist).

A placement engine typically uses a cost function to optimize the placement of circuit elements. Usually, one of the components in the cost function is a weighted sum of the electrical connection lengths (e.g., a weighted sum of the wire lengths of the nets). Therefore, if the electrical connections between the center object and the satellite objects are assigned a greater weight, then the placement engine will try to keep those objects near one another because doing so will help minimize the cost function.

Figure 4D:
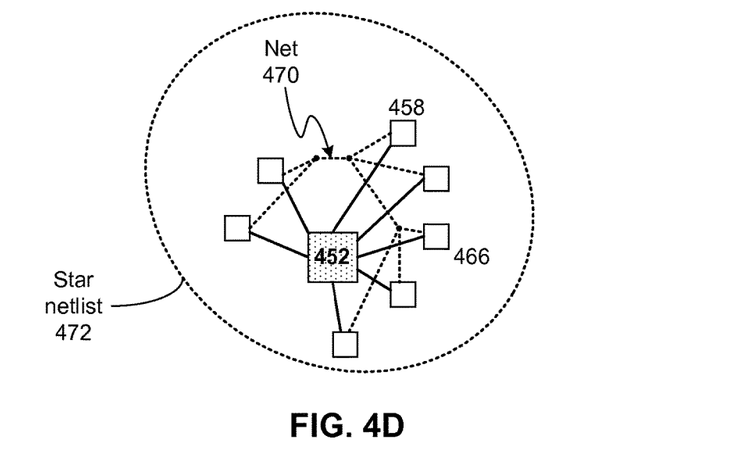
FIG. 4D illustrates a net that electrically interconnects the set of satellite objects in a star netlist with one another in accordance with some embodiments described herein.

In some embodiments described herein, a net can be added to the netlist abstraction that electrically interconnects the satellite objects in a star netlist with one another. Adding such a net can ensure that the placement engine keeps the center object and the satellite objects close to one another during placement. FIG. 4D illustrates a net that electrically interconnects the set of satellite objects in a star netlist with one another in accordance with some embodiments described herein. As shown in FIG. 4D, net 470 can be added to star netlist 472 to ensure that the placement engine keeps center object 452 and the satellite objects (e.g., satellite objects 458 and 466) close to one another during placement. Note that net 470 (shown using dotted lines in FIG. 4D) electrically interconnects all of the satellite objects with one another.

In some embodiments described herein, the sum of the areas of the center object and the satellite objects in each star netlist is substantially equal to the area of the logical hierarchy node that corresponds to the star netlist. When a placement engine places the star netlist (i.e., places the center object and the satellite objects in the star netlist), the total area covered by the star netlist should correspond to the total area of the circuitry that the star netlist represents. Otherwise, the placement engine may not generate a meaningful output when the placement engine performs placement on the netlist abstraction.

EDA System

Figure 5:
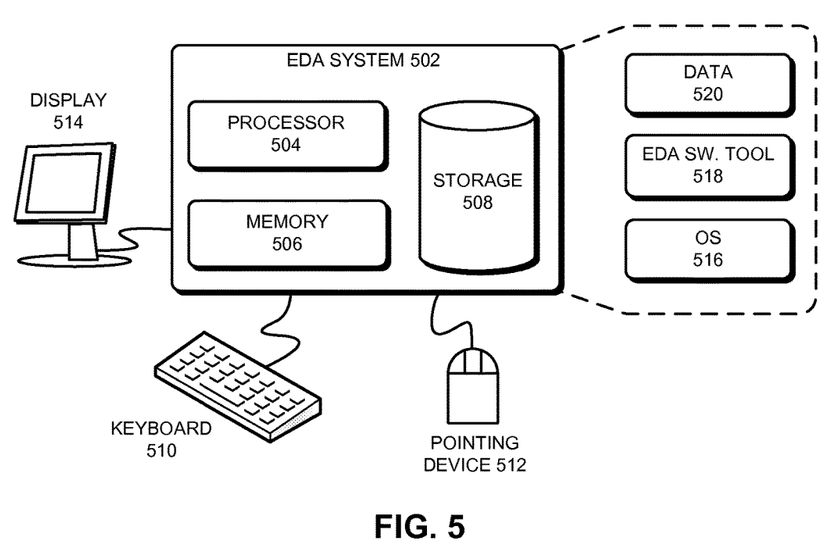
FIG. 5 illustrates an EDA system in accordance with some embodiments described herein.

The term "EDA system" generally refers to any hardware based system, e.g., a computing system comprising one or more processors, that is used for designing a circuit using an EDA flow. Examples of EDA systems include, but are not limited to, an EDA software tool in a personal computer, EDA software tool in a laptop computer, EDA software tool in a desktop computer, EDA software tool in a handheld computer, EDA software tool in a smartphone, EDA software tool in a tablet computer, EDA software tool in a distributed computer, EDA software tool in a server farm, EDA software tool in a single processor or multi-processor computing system, and EDA software tool in a cloud based computing system. FIG. 5 illustrates an EDA system in accordance with some embodiments described herein. EDA system 502 can include processor 504, memory 506, and storage device 508. Specifically, memory locations in memory 506 can be addressable by processor 504, thereby enabling processor 504 to access (e.g., via load/store instructions) and manipulate (e.g., via logical/floating point/arithmetic instructions) the data stored in memory 506. EDA system 502 can be coupled to display device 514, keyboard 510, and pointing device 512. Storage device 508 can store operating system 516, EDA software tool 518, and data 520. Data 520 can include input required by EDA software tool 518 and/or output generated by EDA software tool 518.

EDA system 502 may automatically (or with user intervention) perform one or more operations that are implicitly or explicitly described in this disclosure. For example, EDA system 502 can load EDA software tool 518 into memory 506, and EDA software tool 518 can then be used to perform floorplanning operations on a netlist abstraction that provides full-chip context, thereby substantially improving performance and quality of results. The resulting circuit design can be subsequently provided to a semiconductor manufacturing facility for producing IC chips.

CONCLUSION

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
using one or more processors of a computing system to create a netlist abstraction based on a netlist of a circuit design, wherein the netlist is divided into a top-level portion and a set of physical blocks, and wherein creating the netlist abstraction comprises:
creating a top-level netlist abstraction based on the top-level portion of the netlist;
for each physical block in the set of physical blocks, creating a physical block netlist abstraction based on a portion of the netlist that is in the physical block, wherein the physical block netlist abstraction retains macros that are in the physical block; and
retaining (1) connectivity information between objects in the netlist abstraction, (2) blockage information that identifies blockages for floorplanning operations, (3) move bound information which specifies spatial boundaries within which objects in the netlist abstraction must be placed, and (4) power domain information which specifies power domains associated with objects in the netlist abstraction;
loading the netlist abstraction into a memory of the computing system, wherein the netlist abstraction provides full-chip context of the circuit design for performing floorplanning operations; and
performing floorplanning operations on the netlist abstraction to create a floorplan for the circuit design.

2. The method of claim 1, wherein the floorplanning operations comprise macro placement which determines physical locations for macros in the circuit design.

3. The method of claim 1, wherein the top-level netlist abstraction and the physical block netlist abstraction for each physical block in the set of physical blocks are created independently of one another, and wherein said retaining connectivity information between objects in the netlist abstraction comprises retaining connectivity information between ports of the top-level netlist abstraction and physical block netlist abstractions corresponding to the set of physical blocks.

4. The method of claim 1, wherein at least one physical block netlist abstraction comprises a logical netlist abstraction corresponding to a logical hierarchy (LH) node in an LH of the netlist of the circuit design, wherein the LH node encompasses a macro in the physical block.

5. The method of claim 1, wherein retaining connectivity information between objects in the netlist abstraction comprises:
performing tracing on the netlist of the circuit design to identify electrical connections between macros and one or more logical netlist abstractions; and
retaining the identified electrical connections.

6. The method of claim 1, wherein the top-level netlist abstraction comprises one or more logical netlist abstractions, wherein each logical netlist abstraction corresponds to a portion of the netlist that is below a logical hierarchy (LH) node in an LH of the netlist of the circuit design, wherein each logical netlist abstraction comprises a center object that is electrically connected to a set of satellite objects, and wherein each satellite object corresponds to a port of the LH node; and
wherein each physical block netlist abstraction comprises one or more logical netlist abstractions, wherein each logical netlist abstraction corresponds to a portion of the netlist that is below a logical hierarchy (LH) node in an LH of the netlist of the circuit design, wherein each logical netlist abstraction comprises a center object that is electrically connected to a set of satellite objects, and wherein each satellite object corresponds to a port of the LH node.

7. A non-transitory computer-readable storage medium storing instructions that, when executed by a computing system, cause the computing system to perform a method comprising:
creating a netlist abstraction based on a netlist of a circuit design, wherein the netlist is divided into a top-level portion and a set of physical blocks, and wherein said creating the netlist abstraction comprises:
creating a top-level netlist abstraction based on the top-level portion of the netlist;
for each physical block in the set of physical blocks, creating a physical block netlist abstraction based on a portion of the netlist that is in the physical block, wherein the physical block netlist abstraction retains macros that are in the physical block; and
retaining (1) connectivity information between objects in the netlist abstraction, (2) blockage information that identifies blockages for floorplanning operations, (3) move bound information which specifies spatial boundaries within which objects in the netlist abstraction must be placed, and (4) power domain information which specifies power domains associated with objects in the netlist abstraction;
loading the netlist abstraction into a memory of the computing system, wherein the netlist abstraction provides full-chip context of the circuit design for performing floorplanning operations; and
performing floorplanning operations on the netlist abstraction to create a floorplan for the circuit design.

8. The non-transitory computer-readable storage medium of claim 7, wherein the floorplanning operations comprise macro placement which determines physical locations for macros in the circuit design.

9. The non-transitory computer-readable storage medium of claim 7, wherein the top-level netlist abstraction and the physical block netlist abstraction for each physical block in the set of physical blocks are created independently of one another, and wherein said retaining connectivity information between objects in the netlist abstraction comprises retaining connectivity information between ports of the top-level netlist abstraction and physical block netlist abstractions corresponding to the set of physical blocks.

10. The non-transitory computer-readable storage medium of claim 7, wherein at least one physical block netlist abstraction comprises a logical netlist abstraction corresponding to a logical hierarchy (LH) node in an LH of the netlist of the circuit design, wherein the LH node encompasses a macro in the physical block.

11. The non-transitory computer-readable storage medium of claim 7, wherein retaining connectivity information between objects in the netlist abstraction comprises:
performing tracing on the netlist of the circuit design to identify electrical connections between macros and one or more logical netlist abstractions; and
retaining the identified electrical connections.

12. The non-transitory computer-readable storage medium of claim 7, wherein the top-level netlist abstraction comprises one or more logical netlist abstractions, wherein each logical netlist abstraction corresponds to a portion of the netlist that is below a logical hierarchy (LH) node in an LH of the netlist of the circuit design, wherein each logical netlist abstraction comprises a center object that is electrically connected to a set of satellite objects, and wherein each satellite object corresponds to a port of the LH node; and
wherein each physical block netlist abstraction comprises one or more logical netlist abstractions, wherein each logical netlist abstraction corresponds to a portion of the netlist that is below a logical hierarchy (LH) node in an LH of the netlist of the circuit design, wherein each logical netlist abstraction comprises a center object that is electrically connected to a set of satellite objects, and wherein each satellite object corresponds to a port of the LH node.

13. An apparatus, comprising:
one or more processors; and
a non-transitory storage medium storing instructions that, when executed by the one or more processors, cause the apparatus to perform a method comprising:
creating a netlist abstraction based on a netlist of a circuit design, wherein the netlist is divided into a top-level portion and a set of physical blocks, and wherein said creating the netlist abstraction comprises:
creating a top-level netlist abstraction based on a top-level portion of the netlist;
for each physical block in the set of physical blocks, creating a physical block netlist abstraction based on a portion of the netlist that is in the physical block, wherein the physical block netlist abstraction retains macros that are in the physical block; and
retaining (1) connectivity information between objects in the netlist abstraction, (2) blockage information that identifies blockages for floorplanning operations, (3) move bound information which specifies spatial boundaries within which objects in the netlist abstraction must be placed, and (4) power domain information which specifies power domains associated with objects in the netlist abstraction;

loading the netlist abstraction into a memory of the apparatus, wherein the netlist abstraction provides full-chip context of the circuit design for floorplanning operations; and performing floorplanning operations on the netlist abstraction to create a floorplan for the circuit design.

14. The apparatus of claim 13, wherein the floorplanning operations comprise macro placement which determines physical locations for macros in the circuit design.

15. The apparatus of claim 13, wherein the top-level netlist abstraction and the physical block netlist abstraction for each physical block in the set of physical blocks are created independently of one another, and wherein said retaining connectivity information between objects in the netlist abstraction comprises retaining connectivity information between ports of the top-level netlist abstraction and physical block netlist abstractions corresponding to the set of physical blocks.

16. The apparatus of claim 13, wherein at least one physical block netlist abstraction comprises a logical netlist abstraction corresponding to a logical hierarchy (LH) node in an LH of the netlist of the circuit design, wherein the LH node encompasses a macro in the physical block.

17. The apparatus of claim 13, wherein retaining connectivity information between objects in the netlist abstraction comprises:

performing tracing on the netlist of the circuit design to identify electrical connections between macros and one or more logical netlist abstractions; and retaining the identified electrical connections.

18. The apparatus of claim 13, wherein the top-level netlist abstraction comprises one or more logical netlist abstractions, wherein each logical netlist abstraction corresponds to a portion of the netlist that is below a logical hierarchy (LH) node in an LH of the netlist of the circuit design, wherein each logical netlist abstraction comprises a center object that is electrically connected to a set of satellite objects, and wherein each satellite object corresponds to a port of the LH node; and wherein each physical block netlist abstraction comprises one or more logical netlist abstractions, wherein each logical netlist abstraction corresponds to a portion of the netlist that is below a logical hierarchy (LH) node in an LH of the netlist of the circuit design, wherein each logical netlist abstraction comprises a center object that is electrically connected to a set of satellite objects, and wherein each satellite object corresponds to a port of the LH node.

* * * * *